US 8,842,607 B2

United States Patent
Chan et al.

(10) Patent No.: US 8,842,607 B2
(45) Date of Patent: Sep. 23, 2014

(54) MOBILITY MANAGEMENT SYSTEM AND METHOD

(75) Inventors: Hinghung Anthony Chan, Plano, TX (US); Hanan Ahmed, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 296 days.

(21) Appl. No.: 12/851,266

(22) Filed: Aug. 5, 2010

(65) Prior Publication Data
US 2011/0170479 A1 Jul. 14, 2011

Related U.S. Application Data

(60) Provisional application No. 61/293,575, filed on Jan. 8, 2010.

(51) Int. Cl.
*H04Q 7/00* (2006.01)
*H04L 12/28* (2006.01)

(52) U.S. Cl.
USPC .......................................... 370/328; 370/389

(58) Field of Classification Search
USPC ................. 370/328, 338, 351, 389, 392, 401
See application file for complete search history.

(56) References Cited

U.S. PATENT DOCUMENTS

| | | | |
|---|---|---|---|
| 7,127,700 B2 | 10/2006 | Large | |
| 7,603,477 B2 | 10/2009 | Choi et al. | |
| 7,676,595 B2 | 3/2010 | Ettikan | |
| 7,840,217 B2 | 11/2010 | Patel et al. | |
| 7,929,556 B2 | 4/2011 | Melia et al. | |
| 7,965,695 B2 * | 6/2011 | Valko et al. | 370/338 |
| 8,040,845 B2 | 10/2011 | Oulai et al. | |
| 8,068,840 B2 | 11/2011 | Patel et al. | |
| 8,085,793 B2 | 12/2011 | Krishnan et al. | |
| 8,102,815 B2 * | 1/2012 | Krishnan | 370/331 |
| 8,160,038 B1 | 4/2012 | Zhao et al. | |
| 8,170,010 B2 | 5/2012 | Bachmann et al. | |
| 8,265,037 B2 | 9/2012 | Park et al. | |
| 8,385,263 B2 | 2/2013 | Hirano et al. | |
| 8,570,941 B2 | 10/2013 | Tsirtsis et al. | |
| 2003/0035390 A1 * | 2/2003 | Choi et al. | 370/331 |

(Continued)

FOREIGN PATENT DOCUMENTS

| | | |
|---|---|---|
| CN | 101175316 A | 5/2008 |
| CN | 101212773 A | 7/2008 |

(Continued)

OTHER PUBLICATIONS

Gundavelli, S., et al., "Proxy Mobile IPv6", RFC 5213, Standards Track, Aug. 2008, pp. 41-67.

(Continued)

*Primary Examiner* — Hong Cho
(74) *Attorney, Agent, or Firm* — Slater & Matsil, L.L.P.

(57) ABSTRACT

A method and system for optimizing mobility routing are disclosed. A preferred embodiment comprises a first system of networks that comprise a home local mobility anchor and two or more distributed local mobility anchors, and a second system of networks separate from the first system of networks. Packets of data may be transmitted from a correspondent node anchored in the second system of networks to a mobile node anchored in the second system. Additionally, packets of data may be transmitted from the mobile node to the correspondent node.

20 Claims, 6 Drawing Sheets

(56) References Cited

U.S. PATENT DOCUMENTS

| | | |
|---|---|---|
| 2006/0018291 A1 | 1/2006 | Patel et al. |
| 2006/0291446 A1 | 12/2006 | Caldwell et al. |
| 2007/0189219 A1 | 8/2007 | Navali et al. |
| 2007/0254661 A1 | 11/2007 | Chowdhury et al. |
| 2008/0084847 A1 | 4/2008 | Xia et al. |
| 2009/0040964 A1 | 2/2009 | Zhao et al. |
| 2009/0080441 A1 | 3/2009 | Krishnan et al. |
| 2009/0248708 A1* | 10/2009 | Balasubramanian et al. ... 707/100 |
| 2009/0290529 A1 | 11/2009 | Toyokawa et al. |
| 2009/0303932 A1 | 12/2009 | Tsirtsis et al. |
| 2009/0310564 A1 | 12/2009 | Kim et al. |
| 2010/0046419 A1* | 2/2010 | Hirano et al. ............ 370/315 |
| 2010/0080172 A1 | 4/2010 | Jin et al. |
| 2010/0082796 A1 | 4/2010 | Akiyoshi |
| 2010/0150055 A1* | 6/2010 | Hori et al. ............ 370/328 |
| 2010/0177698 A1 | 7/2010 | Salmela et al. |
| 2010/0208691 A1* | 8/2010 | Toyokawa ............ 370/331 |
| 2010/0214982 A1 | 8/2010 | Hirano et al. |
| 2010/0268804 A1 | 10/2010 | Aso et al. |
| 2010/0278070 A1 | 11/2010 | Melia et al. |
| 2010/0284329 A1 | 11/2010 | Park et al. |
| 2010/0296481 A1* | 11/2010 | Weniger et al. ............ 370/331 |
| 2010/0303031 A1 | 12/2010 | Rune |
| 2011/0002248 A1 | 1/2011 | Hirano et al. |
| 2011/0002300 A1 | 1/2011 | Lee et al. |
| 2011/0026453 A1 | 2/2011 | Yan |
| 2011/0080866 A1 | 4/2011 | Chan et al. |
| 2011/0080872 A1 | 4/2011 | Chan et al. |
| 2011/0116450 A1 | 5/2011 | Hirano et al. |
| 2011/0149839 A1 | 6/2011 | Toyokawa et al. |
| 2011/0170479 A1 | 7/2011 | Chan et al. |
| 2011/0246629 A1 | 10/2011 | Savolainen et al. |
| 2011/0255473 A1 | 10/2011 | Wu et al. |
| 2012/0120872 A1 | 5/2012 | Korhonen et al. |
| 2012/0140719 A1 | 6/2012 | Hui et al. |

FOREIGN PATENT DOCUMENTS

| | | |
|---|---|---|
| WO | 0167798 A1 | 9/2001 |
| WO | 2006012511 A1 | 2/2006 |
| WO | 2009016059 A1 | 2/2009 |
| WO | 2009044539 A1 | 4/2009 |

OTHER PUBLICATIONS

International Search Report regarding International Patent Application No. PCT/CN2010/076825, Dec. 16, 2010, 3 pages.

International Search Report regarding International Patent Application No. PCT/CN2010/076991, dated Dec. 23, 2010, 3 pages.

Written Opinion of the International Searching Authority regarding International Patent Application No. PCT/CN2010/076825, Dec. 16, 2010, 5 pages.

Written Opinion of the International Searching Authority regarding International Patent Application No. PCT/CN20101076991, dated Dec. 23, 2010, 4 pages.

* cited by examiner

MOBILITY MANAGEMENT SYSTEM AND METHOD

This application claims the benefit of U.S. Provisional Application No. 61/293,575, filed on Jan. 8, 2010, entitled "Interworking between Different IP Mobility Protocols" which application is hereby incorporated herein by reference.

TECHNICAL FIELD

The present invention relates generally to network communication technology, and more particularly to a system and method for optimizing data routing between a mobile node in a Proxy Mobile Internet Protocol (PMIP) network and a correspondent node.

BACKGROUND

Wireless communication systems have become an important means by which many people worldwide have come to communicate. A wireless communication system interconnects many nodes by using electromagnetic waves, such as radio waves, rather than wires commonly used in a fixed telephone network system. A wireless communication system often consists of many mobile devices and a plurality of base stations. A base station serves a mobile device when the mobile device enters a region associated with the base station.

A modern communication system includes many interconnected networks, which consist of both wireless networks and fixed networks. In a modern communication network, each mobile device has its own internet protocol (IP) address. The IP addresses are used to transmit data packets from one mobile device to another device. In order to serve a mobile device while it is travelling (or roaming) from a registered network to a visited network, Mobile IP has been proposed by the Internet Engineering Task Force (IETF) to allow mobile device users to move from one network to another while maintaining a permanent IP address.

A version of Mobile IP is Mobile IP version 6 (MIPv6). In a MIPv6 based communication system, a mobile device has a home address (HoA). When the mobile device changes its location and moves into a visited network, it receives a care-of address (CoA) from the visited network. In a MIPv6 mobile network, the mobile device then sends a binding update to a home agent in its home network. The binding update causes the home agent to establish a binding between the HoA and the CoA. Subsequently, the home network forwards data packets destined to the mobile device's HoA to the mobile device's current CoA.

Proxy MIPv6 (PMIPv6) is a variant of MIPv6 where the mobile device is not involved in the updating of its current location. Instead, PMIPv6 relies on a proxy mobility agent, such as Mobile Access Gateway (MAG), to detect a mobile device's attachments and detachments and signal the binding update to the a local mobility anchor (LMA). PMIPv6 is promulgated to support an efficient binding update by assigning the proxy agents, such as the MAGs, to report the location change to the home LMA.

One disadvantage of the existing PMIPv6 based network is the triangle routing problem caused by having the LMA in one single network and illustrated in FIG. 1. FIG. 1 includes a home network 140, a home LMA (H-LMA) 150, a visited network 130, a MAG 160, a Mobile Node (MN) 110 and a Correspondent Node (CN) 120. The CN is a communication partner of the MN. The MN 110 and the CN 120 are geographically close to each other, but both the MN 110 and the CN 120 may be far away from the H-LMA 150. The MN 110 is located within a visited network 130.

In a PMIPv6 network, the MN 110 may be a notebook computer, a mobile phone or a PDA. The MN 110 has two IP addresses in a PMIPv6 network. The H-LMA 150 allocates an HoA to the MN 110. The HoA is used to communicate with the CN 120. This address does not change and serves the purpose of identification of the MN 110. In contrast, a CoA or proxy-CoA is a temporary address for an MN 110 to receive packets when it visits a foreign network. In this PMIPv6 network example, when the MN 110 moves from the H-LMA 150 and enters a visited network, the MAG 160 detects the attachment and signals a binding update to the H-LMA 150 located in the home network 140. The H-LMA 150 binds the CoA or proxy-CoA of the MAG 160 with the HoA to map the MN's 110 current routing location with its HoA.

When the CN 120 sends messages to the MN 110, the messages are addressed to the HoA of the MN 110. In accordance with the home address attached with the messages, the messages are directed to the home network where the H-LMA 150 intercepts the message. The H-LMA 150 tunnels the messages to the MN 110's visited network based on its CoA or the MAG 160 in the MN 110's visited network. The network repeats this triangle routing until all messages from the CN 120 reach the MN 110. Accordingly, the communication path is unnecessarily long, and results in inefficient routing and high message delays.

This triangle problem may be accentuated when a network utilizing the PMIPv6 network attempts to communicate to another, separate network systems or domains, such as a network which may be owned by another service provider. In such a case, the triangle problem may occur in both networks. That is, when the MN 260 belonging to one network system 200 served by one H-LMA 215 communicates with a second MN 295 belonging to another network 205 served by another H-LMA, the packet will traverse both the first H-LAM 215 and the second H-LMA 265, thereby causing a delay during each transmission of data.

Accordingly, what is needed in the art is an optimized mobility routing for a system having two separate networks.

SUMMARY OF THE INVENTION

These and other problems are generally solved or circumvented, and technical advantages are generally achieved, by preferred embodiments of the present invention which provide a method and system for communication between networks.

In accordance with a preferred embodiment of the present invention, a method of transmitting data comprises transmitting a data packet from a first distributed local mobility anchor in a first system of networks to an egress point of the system of networks.

In accordance with another preferred embodiment of the present invention a method of transmitting data comprises receiving a first data packet at an ingress point of a first system of networks, wherein the data packet comprises a first destination address and the first system of networks comprises a home local mobility anchor and a first distributed local mobility anchor. The first data packet is intercepted at the first distributed local mobility anchor and the first data packet is routed to the home local mobility anchor. The first data packet is received at the home local mobility anchor and, in response to the first data packet, a second destination address is transmitted to the first distributed local mobility anchor. A second data packet is received at the ingress point, the second data packet comprising the first destination address. The second data packet is intercepted at the first distributed local mobility anchor and the second data packet is routed to the second destination address from the first distributed local mobility anchor.

In accordance with yet another preferred embodiment of the present invention, a system for transmitting data comprises a first system of networks, the first system of networks comprising distributed local mobility anchors and a first ingress/egress point. A second system of networks is separate and independent from the first system of networks and comprises a second ingress/egress point, wherein the first ingress/egress point is communicably coupled to the second ingress/egress point.

An advantage of a preferred embodiment of the present invention is bypassing an unnecessarily long data path that may occur during the transmission of data packets. Such a bypass optimizes the data paths and allows for a more efficient use of network resources.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system having distributed local mobility anchors for communicating with a separate network. The invention may also be applied, however, to other communication networks.

Figure 1:
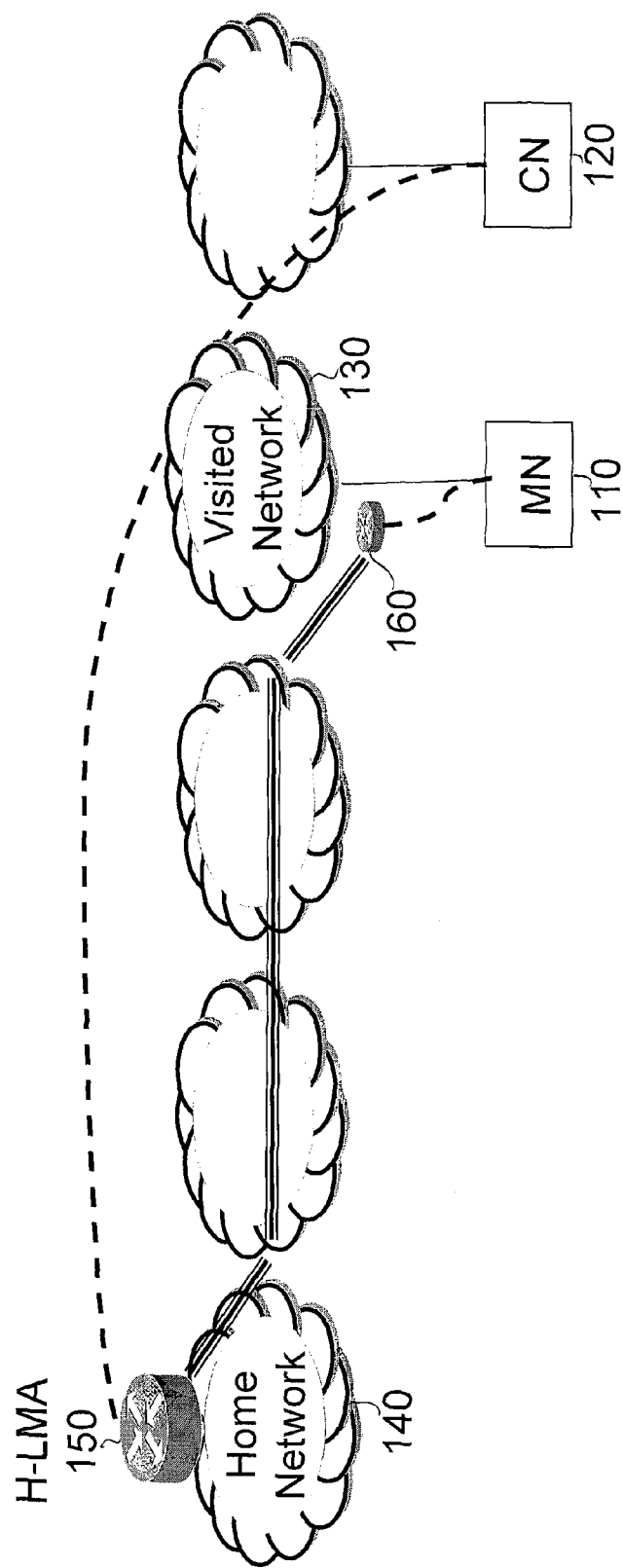
FIG. 1 illustrates the triangle routing problem in network communication systems as known in prior art.
Figure 2A:
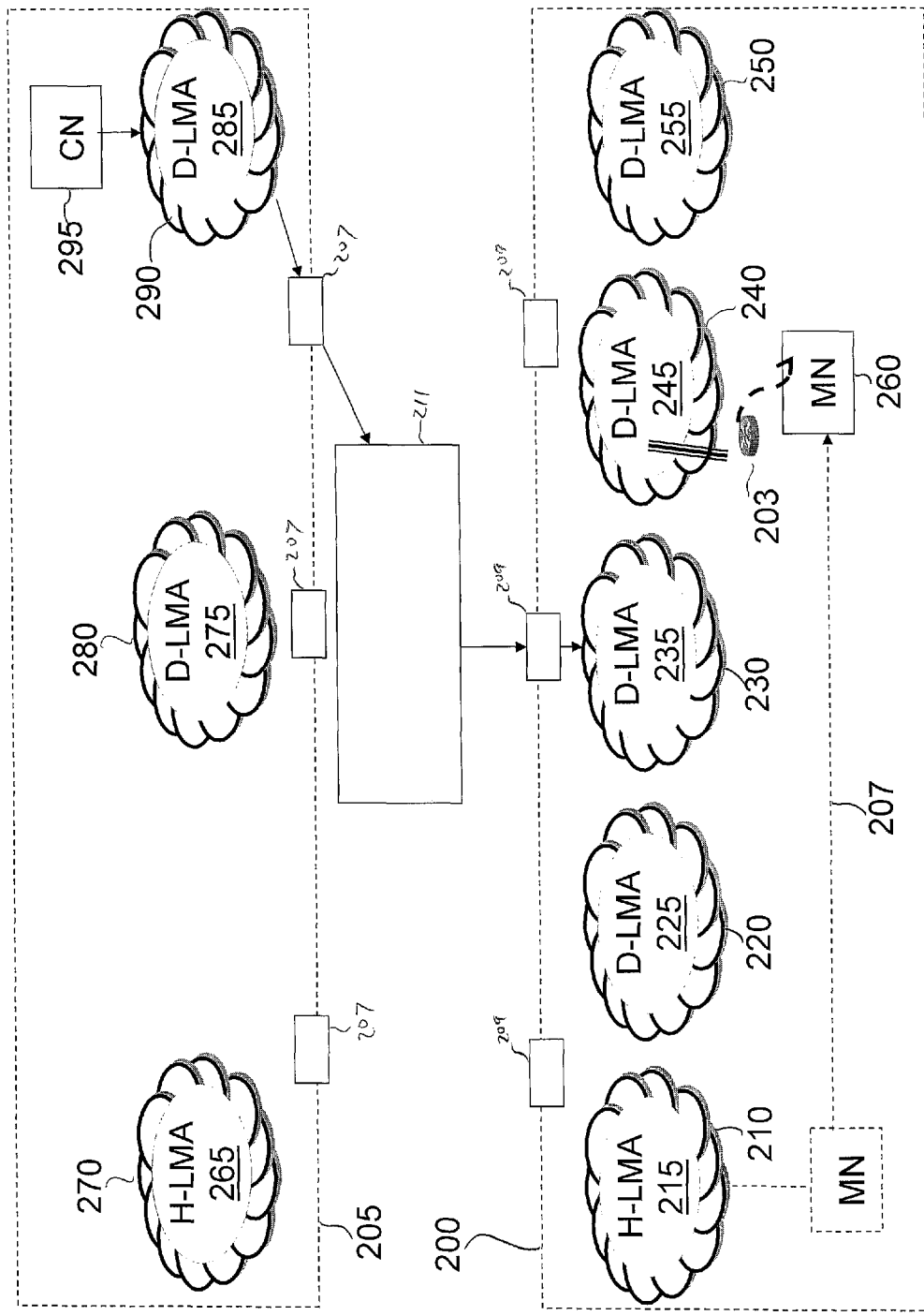
FIGS. 2A-2C illustrate communications from a second system of networks to a first system of networks in accordance with an embodiment of the present invention.

With reference now to FIG. 2A, a first system of networks 200 and a second system of networks 205 are illustrated that provide communication between a first Mobile Node (MN) 260 and a fixed Correspondent Node (CN) 295. The first system of networks 200 and the second system of networks 205 are independent and independent of each other, such as by being networks of separate and independent service providers. As such, if desired, the first system of networks 200 may operate and transmit data internally independently from the second system of networks 205, and the second system of networks 205 may operate and transmit data internally independently from the first system of networks 200.

The first MN 260 may comprise any device that may change its location within the first system of networks 200, and still desires to communicate, either directly or indirectly, with the first system of networks 200. The first MN 260 may include mobile phones, personal data assistants (PDAs), notebook computers, other computers that may change location, or the like, any suitably portable device that may be used to transfer data from itself to another device may be used as the first MN 260. All such devices are fully intended to be included within the scope of the present invention. As illustrated in FIG. 2A, the first MN 260 may initially be anchored to the first network 210 and a home local mobility anchor (H-LMA) 215 (discussed further below) located within the first network 210.

The CN 295 may comprise any device, such as a computer or telephone, that can communicate with the first MN 260 and has a relatively fixed position within the second system of networks 200. For example, the CN 295 may have a static, fixed address within the first system of networks 200 that will not change over time. As such, the CN 295 may be a mobile device or a fixed node in its home network, or else may be a mobile node which may be in a visited network.

The first system of networks 200 may include a first home network 210 (a network to which the first MN 260 is initially registered), a second network 220, a third network 230, a fourth network 240, and a fifth network 250. Each of the individual networks may comprise one or more computers or other devices connected to a common server that preferably share a common Internet Protocol (IP) address. For example, the networks may be an access service network (ASN), a connectivity service network (CSN), a plurality of ASNs or CSNs, combinations of these, or the like. Additionally, each of the individual networks may be located in various geographic locations, wherein some networks may be geographically close to each other and other networks may be geographically far away from each other. For example, the fourth network 240 and the fifth network 250 may be close to each other geographically, but they may be far removed from the first network 210.

The first system of networks 200 may also have a series of first ingress/egress points 209. These first ingress/egress points 209 may act as gatekeepers for the first system of networks 200, controlling the flow of data packets into and away from the first system of networks 200. The first ingress/egress points 209 may comprise, e.g., routers that control the flow of traffic into and out of the first system of networks 200.

Additionally, each of the individual networks may include certain infrastructure to assist it in providing communication services, such as wireless access points (WAPs), base transceiver stations (BTSs), base station controllers (BSCs), routers, switches, bridges, and/or routing logic circuitry. Suitable networks may include the world-wide interoperability for microwave access (WiMAX), Wireless Fidelity (Wi-Fi), code division multiple access (CDMA), wideband CDMA (WCDMA), orthogonal frequency division multiple access (OFDMA), time division multiple access (TDMA), global system for mobile communications (GSM), enhanced data for GSM evolution (EDGE), universal mobile telecommunications system (UMTS), advanced mobile phone service (AMPS), Long Term Evolution (LTE), Evolved Packet Core (EPC), or the like.

Furthermore, each of the individual networks (e.g., the first home network 210, the second network 220, the third network 230, the fourth network 240, and the fifth network 250) may comprise a number of subnetworks, or distinctly addressable regions within the individual networks that may be addressed separately from each other while still sharing the common IP address. Furthermore, it should be recognized that while FIG. 2 may illustrate the first system of networks 200 having five networks with various subnetworks, the first system of networks 200 may accommodate any number and configuration of networks while still remaining within the scope of the present invention.

The first system of networks 200 may preferably operate with a mobility management protocol such as Proxy Mobile Internet Protocol version 6 (PMIPv6). In the PMIPv6 protocol, the first MN 260 is assigned an initial home address (HoA) of 128 bits by the first home network 210 to which it is registered. Then, when the first MN 260 moves from network to network (e.g., from the first home network 210 to the fourth network 240, as illustrated in FIG. 2A by the dashed line 208), the first MN 260 maintains the original HoA. However, the first system of networks 200 itself, through the use of local mobility anchors (LMAs, discussed further below), are updated with the current address of the first MN 260 and can route data packets to the first MN's 260 current location by appending a proxy-"Care -of" address (CoA) onto the data packet and routing the data packet to the first MN's 260 current location through the first MAG 203.

However, as one of ordinary skill in the art will recognize, the PMIPv6 protocol described above is intended to be illustrative only, and is not intended to limit the present invention to the PMIPv6 protocol. Any other suitable mobility management protocol, such as MPIPv4, mobile IP, combinations of these, or the like, may alternatively be utilized with the present invention, and all of these alternative mobility management protocols are fully intended to be included within the scope of the present invention.

Preferably, the mobility management protocol may use an ANYCAST addressing technique to address and send data packets from point to point. In the ANYCAST technique, each of the individual LMAs (discussed further below and comprising the H-LMA 215, the first D-LMA 225, the second D-LMA 235, the third D-LMA 245, and the fourth D-LMA 255) may own a set of IP prefixes which the individual LMAs may use to allocate HoAs to, e.g., the first MN 260. The HoA prefixes of all of the individual LMAs may form a superset of HoA prefixes, some of which may be aggregatable and some of which may not be aggregatable.

In order to expedite communications, all of the individual LMAs advertise the superset of common ANYCAST addresses/prefixes. The originating network, such as the first network 210 if the first MN 260 is transmitting the data packet, includes with the data packet both the HoA along with the ANYCAST address/prefix. With the ANYCAST address/prefix, a data packet from the first MN 260 may be intercepted by any of the individual LMAs broadcasting the superset of ANYCAST addresses/prefixes, such as the nearest LMA advertising the superset, taking into account not only geography but also the topology of the networks themselves. In this fashion, if the geographically closest network is interrupted by an interruption of service, the data packet can be routed to the next closest computer advertising the superset, thereby helping to optimize the overall performance of the ANYCAST technique.

However, as one of ordinary skill in the art will recognize, the ANYCAST addressing technique described above is merely an exemplary embodiment and is not intended to limit the scope of the present invention. Any other suitable addressing/routing technique may alternatively be utilized instead of the ANYCAST addressing/routing system. All such addressing/routing systems are fully intended to be included within the scope of the present invention.

The first system of networks 200 may be configured in a distributed LMA configuration that may include one or more home local mobility anchor (H-LMA) 215, such as the H-LMA 215 located within the first home network 210. The H-LMA 215 may be implemented in either hardware or software and can download from a home AAA server the profile of the first MN 260. Additionally, the H-LMA 215 may provide three or more distinct logical functions pertaining to the first system of networks 200. First, the H-LMA 215 may provide a home network prefix or home address (HoA) allocation function in which the H-LMA 215 allocates a HoA belonging to a block of ANYCAST prefixes managed by the H-LMA 215 to the first MN 260, which is registered to the first home network 210. To perform the HoA allocation function, the H-LMA 215 may use its own block of IP prefixes to allocate IP addresses to the first MN 260 that is registered to the H-LMA 215. Because the H-LMA 215, the first D-LMA 225, the second D-LMA 235, the third D-LMA 245, and the fourth D-LMA 255 all advertise the same superset of IP prefixes from the H-LMA 215, no matter where the first MN 260 is located, the ANYCAST and the routing algorithms may enable the closest of the LMAs to service the first MN 260.

Secondly, the H-LMA 215 may provide an internetwork location management function in which the H-LMA 215 may manage and track the location within the first system of networks 200 of the first MN 260, thereby providing, with other H-LMAs (not shown), a distributed database of all such records for all mobile devices, including the first MN 260, that are anchored to the first system of networks 200. This internetwork location management function may also include a generation of a care-of address (CoA) or proxy-CoA which may be appended to the HoA in order to appropriately route data packets when the first MN 260 is anchored in a network that is not the first home network 210. As the first MN 260 visits the fourth network 240 from the first home network 210, the H-LMA 215 tracks the location of the first MN 260 and also appends the CoA which, along with the HoA, allows for the transmission of data packets to the first MN 260 when it is anchored to, e.g., the fourth network 240.

Thirdly, the H-LMA 215 may perform a mobility routing function. With this functionality, the H-LMA 215 may receive data packets containing the HoA of the first MN 260 even though the first MN 260 is no longer anchored to the H-LMA 215. The mobility routing function can take the CoA from the internetwork location management and can then add the CoA to the data packets in addition to the HoA. The data packet with both the CoA and the HoA may then be forwarded to the current location of the first MN 260 using, e.g., forwarding mechanisms such as IP-in-IP tunneling, address rewriting, and the like.

Additionally, the H-LMA 215 may forward the data packets to a D-LMA, such as the third D-LMA 245. This situation may arise when the H-LMA 215 uses a hierarchical system to track the location of the first MN 260. In these situations, the H-LMA 215 may forward the data packets to the third D-LMA 245, which may be able to determine how to forward the data packets to their final destination. The third D-LMA 245 may do so through another layer of hierarchy by forwarding the data packet to the CoA of the first MAG 203 which will then forward the packet to the first MN 260.

It should be noted that the three logical functions in the H-LMA 215 may be considered separate and one function does not necessarily need to be co-located with the other two functions. As such, the H-LMA 215 does not need to be located within one single physical entity. In fact, it is possible to have one or more physical entities in one or more locations to provide the various functions described above, and these different entities do not need to be in a on-to-one relationship with each other. Any combination of functionality and physical location may alternatively be utilized with the present embodiments, and all such combinations are fully intended to be included within the scope of the present embodiments.

Further illustrated in FIG. 2A is a plurality of distributed local mobility anchors (D-LMAs), such as a first D-LMA 225 (located in the second network 220), a second D-LMA 235 (located in the third network 230), a third D-LMA 245 (located in the fourth network 240), a fourth D-LMA 255 (located in the fifth network 250). Each of the first D-LMA 225, the second D-LMA 235, the third D-LMA 245, and the fourth D-LMA 255 know which HoA prefixes are owned by the H-LMA 215, and each of the D-LMAs may be implemented in either hardware or software as part of their respective networks (e.g., the second network 220, the third network 230, the fourth network 240, and the fifth network 250). Each of the first D-LMA 225, the second D-LMA 235, the third D-LMA 245, and the fourth D-LMA 255 may also be located within one of the subnetwork levels of each of their respective networks.

The first D-LMA 225, the second D-LMA 235, the third D-LMA 245, and the fourth D-LMA 255 preferably have a functionality that is reduced from the H-LMA 215. For example, while the H-LMA 215 may provide the three functionalities described above (e.g., the HoA allocation function, the internetwork location management function, and the mobility routing function), the first D-LMA 225, second D-LMA 235, third D-LMA 245, and fourth D-LMA 255 may each provide a subset of the three functionalities without the need for the remaining functionalities. Such reduced functionality allows for the first D-LMA 225, second D-LMA 235, third D-LMA 245, and fourth D-LMA 255 to provide needed functionalities within each network without also requiring needless, expensive, and resource intensive replication of the entire H -LMA 125 at each of the individual networks.

As an example, the first D-LMA 225, the second D-LMA 235, the third D-LMA 245, and the fourth D-LMA 255 may each provide the mobility routing function while relying upon the H-LMA 215 to provide the remaining functionalities. As such, when the first MN 260 is initially anchored to the first home network 210 and then visits the fourth network 240, the third D-LMA 245 may take over the mobility routing function from the H-LMA 215 and intercept data packets sent from the first MN 260 in order to route them to their respective destinations without having to rely upon the H-LMA 215.

FIG. 2A also illustrates a binding process that may be used during the transition of the first MN 260 from the first home network 210 to the fourth network 240. In an embodiment utilizing the PMIPv6 mobility management protocol, the fourth network 240 may include a first Mobility Access Gateway (MAG) 203. The first MAG 203 may be responsible for detecting when a first MN 260 is entering or exiting from the fourth network 240. Upon such a detection, the first MAG 203 may initiate a binding update through the third D-LMA 245 to the H-LMA 215 located within the first home network 210. The first MAG 203 may be implemented in either hardware or software, and may be implemented on an access router (not shown) that may be part of the fourth network 240. Additionally, each of the individual networks (e.g., the home network 210, the second network 220, the third network 230, the fourth network 240, or the fifth network 250) may have multiple MAGs located within the networks.

In an embodiment using the PMIPv6 addressing protocol, the fourth network's 240 IP address prefixes and the first home network's 210 IP address prefixes belong to the same superset. The third D-LMA 245 may advertise the superset's IP address prefixes including the home IP address prefixes, which is received by the first MN 260 when the first MN 260 travels within range of the fourth network 240. After the first MN 260 receives the prefix advertisement of its home address IP prefix from the third D-LMA 245, the first MAG 203 may use its IP address as a proxy-CoA and send a binding update message including the proxy-CoA to the third D-LMA 245 on behalf of the first MN 260 using the HoA of the first MN 260.

In order to have a reliable binding update, the third D-LMA 245 identifies which H-LMA 215 the first MN 260 is registered with by examining the HoA's prefix from the first MN 260. After the H-LMA 215 has been identified, the third D-LMA 245 may send a first authentication request including the HoA (or HoA IP prefix in IPv6) and proxy-CoA as well as other needed identifiers to the H-LMA 215. If the H-LMA 215 determines that the first MN 260 with the HoA is valid, the H-LMA 215 may send a first authentication notification back to the third D-LMA 245 which will anchor the first MN 260 with the third D-LMA 245. Subsequently, the third D-LMA 245 may provide the mobility routing function for the first MN 260.

The second system of networks 205 also may have a distributed LMA architecture and, for example, may have a second H-LMA 265 in a sixth network 270, a fifth D-LMA 275 in a seventh network 280, and a sixth D-LMA 285 in an eighth network 290. The second system of networks 205 may operate in a similar fashion as the first system of networks 200 described above (e.g., with an ANYCAST addressing technique and a PMIPv6 mobility management protocol).

However, the second system of networks 205 may operate utilizing a different superset of ANYCAST address prefixes from the first system of networks 205. This situation may occur if the second system of networks 205 is a separate autonomous system from the first system of networks 205 or if the second system of networks 205 is in a network of a separate service provider from the first system of networks 200.

However, as one of ordinary skill in the art will recognize, as the routing process described herein is based upon the destination address and not specifically tied to the origination address of the CN 295, the D-LMA architecture described herein for the second system of networks 205 is merely illustrative and is not meant to limit the present invention in any way. Any other suitable architecture, such as a PMIP domain, mobile IP domain, or the like, may alternatively be utilized, and all such alternative architectures are fully intended to be included within the present invention.

The second system of networks 205 may also have a series of second ingress/egress points 207. These second ingress/ egress points 207 may act as gatekeepers for the second system of networks 205, controlling the flow of data packets into and away from the second system of networks 205. The second ingress/egress points 207 may comprise, e.g., gateway routers that control the flow of traffic into and out of the second system of networks 205.

FIG. 2A also illustrates a communication process in which the CN 295 anchored to the sixth D-LMA 295 in the second system of networks 205, transmits an initial data packet to the first MN 260 anchored to the third D-LMA 245 in the first system of networks 200. In this initial transmission, the data packet containing the HoA of the first MN 260 may be transmitted by the CN 295 and, e.g., intercepted by the sixth D-LMA 285 utilizing the ANYCAST technique. The sixth D-LMA 285, recognizing that the HoA of the data packet contains a prefix outside of the superset of the second system of networks 205 (and therefore belongs to a different autonomous system or to a network belonging to a different service provider), will forward the data packet to, e.g., a point outside of the second system of networks 205.

One technique that may be used to transfer the data packet outside of the second system of networks 205 may be a "hot potato" routing methodology. In this technique the second system of networks 205, in an attempt to minimize the resources used by the second network of systems 205, forward the data packet to the nearest one of the second ingress/egress points 207, taking into consideration such things as geographic location of the second ingress/egress points 207, interruptions of services, combinations of these, and the like. However, as one of ordinary skill in the art will recognize, the "hot potato" routing methodology is merely an illustrative technique, and is not meant to be limiting. Any suitable routing technique to transmit the data packet out of the second system of networks 205 may alternatively be utilized, and all such techniques are fully intended to be included within the scope of the present invention.

The second ingress/egress points 207 may route the data packet to a transit core network 211. The transit core network 211 preferably contains another network which can recognize the ANYCAST prefix included within the data packet and reroute the data packet to one of the first ingress/egress points 209 of the first system of networks 200. For example, the transit core network 211 may be a local area network (LAN), a long distance network, a wide area network (WAN), the Internet, a backbone network, an Asynchronous Transfer Mode (ATM) network, combinations of these, or the like. The transit core network 211 preferably contains a database containing a listing of all associated address prefixes to which it is connected such that it can recognize and re-route data packets based upon their associated addresses.

Once the data packet travels through the first ingress/egress point 209 of the first system of networks 200, the first ingress/egress point 209 may transmit the data packet into the first system of networks 200. In an embodiment utilizing the ANYCAST technique, the nearest L-DMA (in the embodiment illustrated in FIG. 2A the nearest D-LMA is the second D-LMA 235) may intercept the transmitted data packet. At this point, the second D-LMA 235 may seen within the first system of networks 200 comprising the distributed D-LMA architecture as an originating LMA (OD-LMA).

Figure 2B:
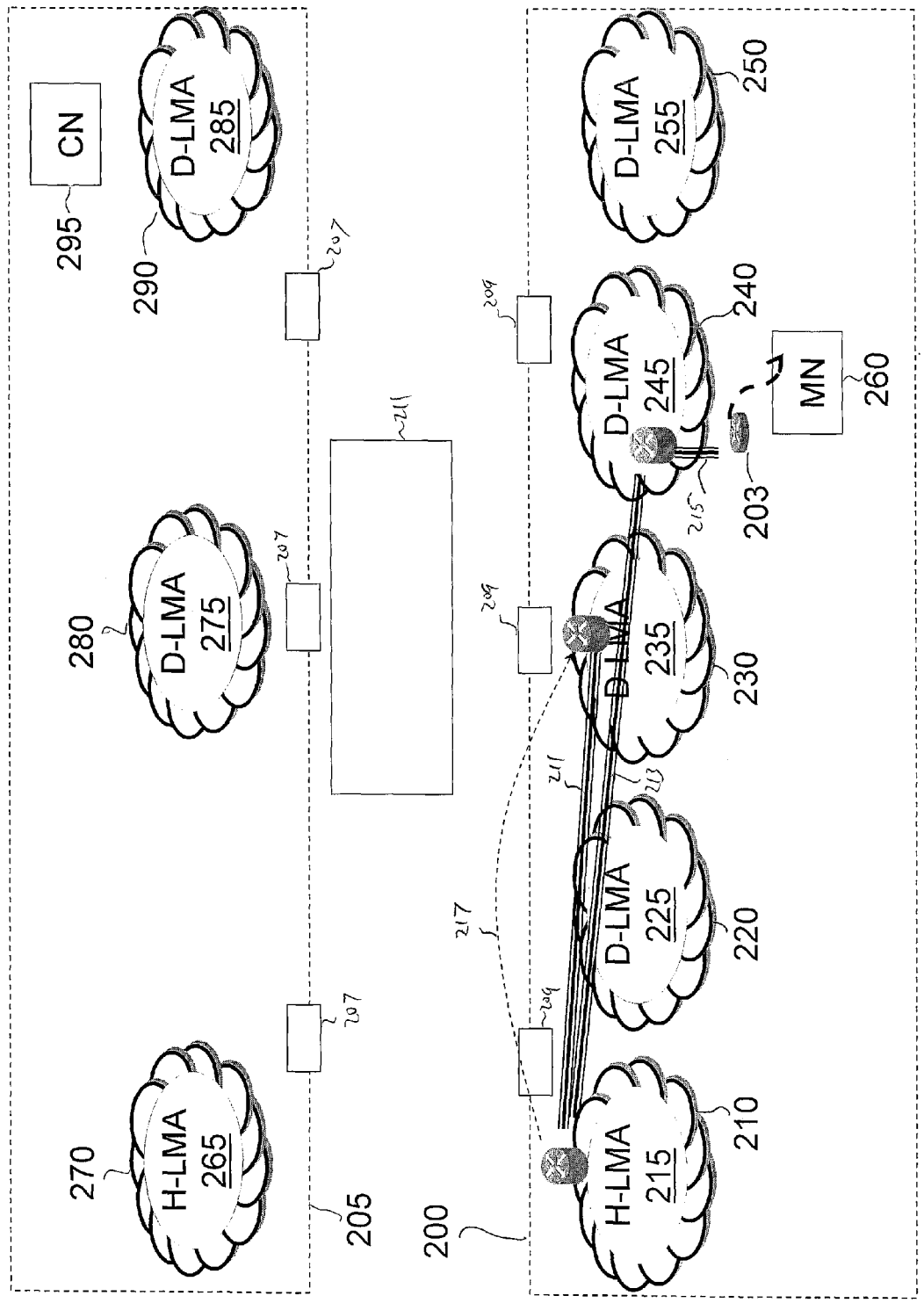

FIG. 2B illustrates an initial step in an optimized routing methodology that may be used to route data packets from the second D-LMA 235 to the first MN 260. As part of the transmission process, the second D-LMA 235 may first scan its memory (which may be a cache other suitable type of memory, not shown) to determine whether the HoA associated with the initial data packet is actually an initial data packet by comparing the HoA with other HoA's that have been stored in the memory. If the first MN's 260 HoA is already stored in the memory, and the second D-LMA 235 already knows where to send the initial data packet (which may occur from a previous communication session between the first MN 260 and the CN 295), the second D-LMA 235 may send the initial data packet directly to the third L-DMA 245 located within the fourth network 245.

However, if the HoA has not been stored in the memory of the second D-LMA 235, the second D-LMA 235, based on the prefix of the HoA, may direct the initial data packet directly to the H-LMA 215. This transmission may be performed by generating a first tunnel 211 to transmit data packets between the second D-LMA 235 and the H-LMA 215. The first tunnel 211 may be set up using a suitable tunneling protocol as is known in the art.

When the H-LMA 215, which has been updated with the first MN's 260 current location through the binding process (described above with respect to FIG. 2A), receives the initial data packet from the second D-LMA 235 through the first tunnel 211, the H-LMA 215 may de-encapsulate the initial data packet to read the HoA of the first MN 260. If the first MN 260 is not anchored to the first network 210 where the H-LMA 215 is located, such as being anchored to the fourth network 240 as illustrated in FIG. 2B, the H-LMA 215 may re-route the initial data packet to the third D-LMA 245 by appending the initial data packet with the CoA or proxy-CoA of the first MN's 260 current network location. The H-LMA 215 may then generate a second tunnel 213 to the third D-LMA 245.

The third D-LMA 245 may de-encapsulate the initial data packet and use the CoA or proxy-CoA to forward the initial data packet to the first MN 260 by, e.g., tunneling the initial data packet to a first mobile access gateway (MAG) 203 located within the fourth network 240. The first MAG 203 may control the connection to the first MN 260, helping to manage data packets to and from the fourth network 240 on behalf of the first MN 260 and ensuring that the data packets are in a form that the first MN 260 can understand. The first MAG 203 may also perform other functions such as push content delivery.

The third D-LMA 245 may forward the initial data packet to the first MAG 203 by generating a third tunnel 215 between the third D-LMA 245 and the first MAG 203, by which the initial data packet may be transmitted to the first MAG 203. The first MAG 203, once it has received the initial data packet from the third D-LMA 245, translates the initial data packet into a form that the first MN 260 can understand and then sends the initial data packet to the first MN 260.

In addition to simply direct the initial data packet to its desired destination, the H-LMA 215 may also send mapping information including the CoA or proxy-CoA of the first MN 260 back to the second D-LMA 235 (as represented in FIG. 2B by dashed line 217), which may save the address information in its memory. With the current address stored in memory, subsequent data packets intercepted by the second D-LMA 235 may be routed directly to the third D-LMA 245 instead of the H-LMA 215, thereby bypassing the H-LMA 215 and eliminating the triangle problem for subsequent data packets.

In an embodiment, the CoA may be held within the memory for a certain amount of time, such as between about ten minutes and about thirty minutes. This time period may be determined using, for example, a timer (not shown). Once the timer has expired, the CoA may be deleted from the memory, and any subsequent transmissions would need to again send the initial data packet to the H-LMA 215 in order to reobtain the CoA from the H-LMA 215.

Figure 2C:
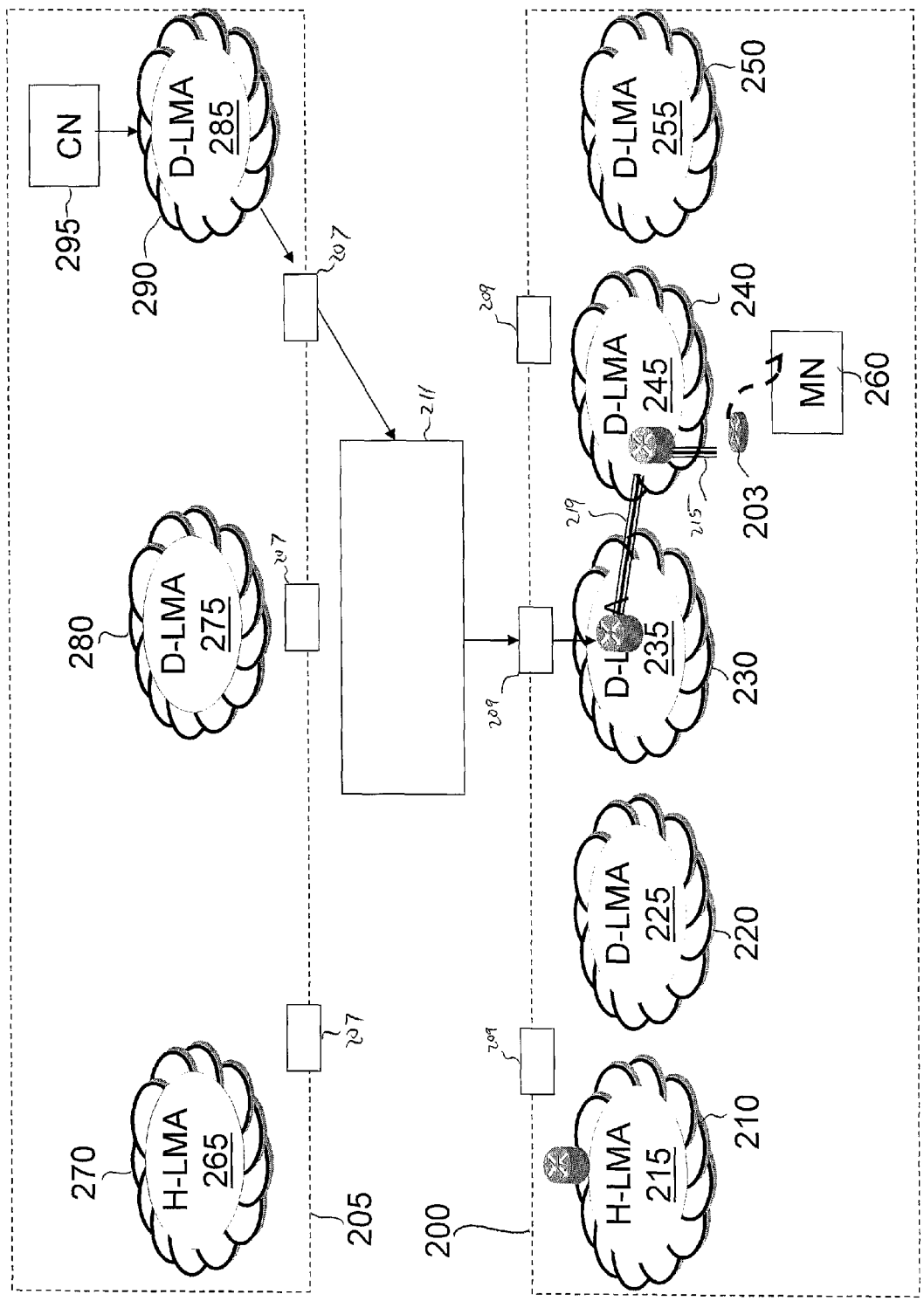

FIG. 2C illustrates a path taken by subsequent, non-initial data packets between the CN 295 and the first MN 260. Similar to the path illustrated in FIG. 2A, the CN 295 transmits the subsequent data packets which are intercepted by the sixth D-LMA 285, which routes the subsequent data packets through the nearest second ingress/egress point 207 to the transit core network 211. The transit core network 211 may forward the data packets to the first ingress/egress point 209 of the first system of networks 200. The first ingress/egress point 209 may broadcast the data packet, which may be intercepted by the second D-LMA 235. However, because the second D-LMA 235 has already acquired the mapping information regarding the first MN's 260 current CoA or proxy-CoA (from the initial data packet process described above with respect to FIG. 2B), the second D-LMA 235 can use the CoA or proxy-CoA to forward the subsequent data packets directly to the third D-LMA 245 using, for example, a fourth tunnel 219. Alternatively, the second D-LMA 235 may use the CoA to directly tunnel the packet to the first MN 260 itself or else to the first MAG 203, thereby bypassing the third D-LMA 245.

By sending the subsequent data packets directly to the third D-LMA 245, the H-LMA 215 can be effectively bypassed from the transmission of subsequent data packets, thereby eliminating the triangle problem within the first system of networks 200 after the initial data packet has been sent. The third D-LMA 245 can forward the subsequent data packets to the first MAG 203 through, e.g., the third tunnel 215, and the first MAG 203 can translate the subsequent data packets and then forward the subsequent data packets to the first MN 260. Such a bypassing optimization may be performed during an initial setup routine, and may have only a minimal impact over the entirety of the communication.

Figure 3:
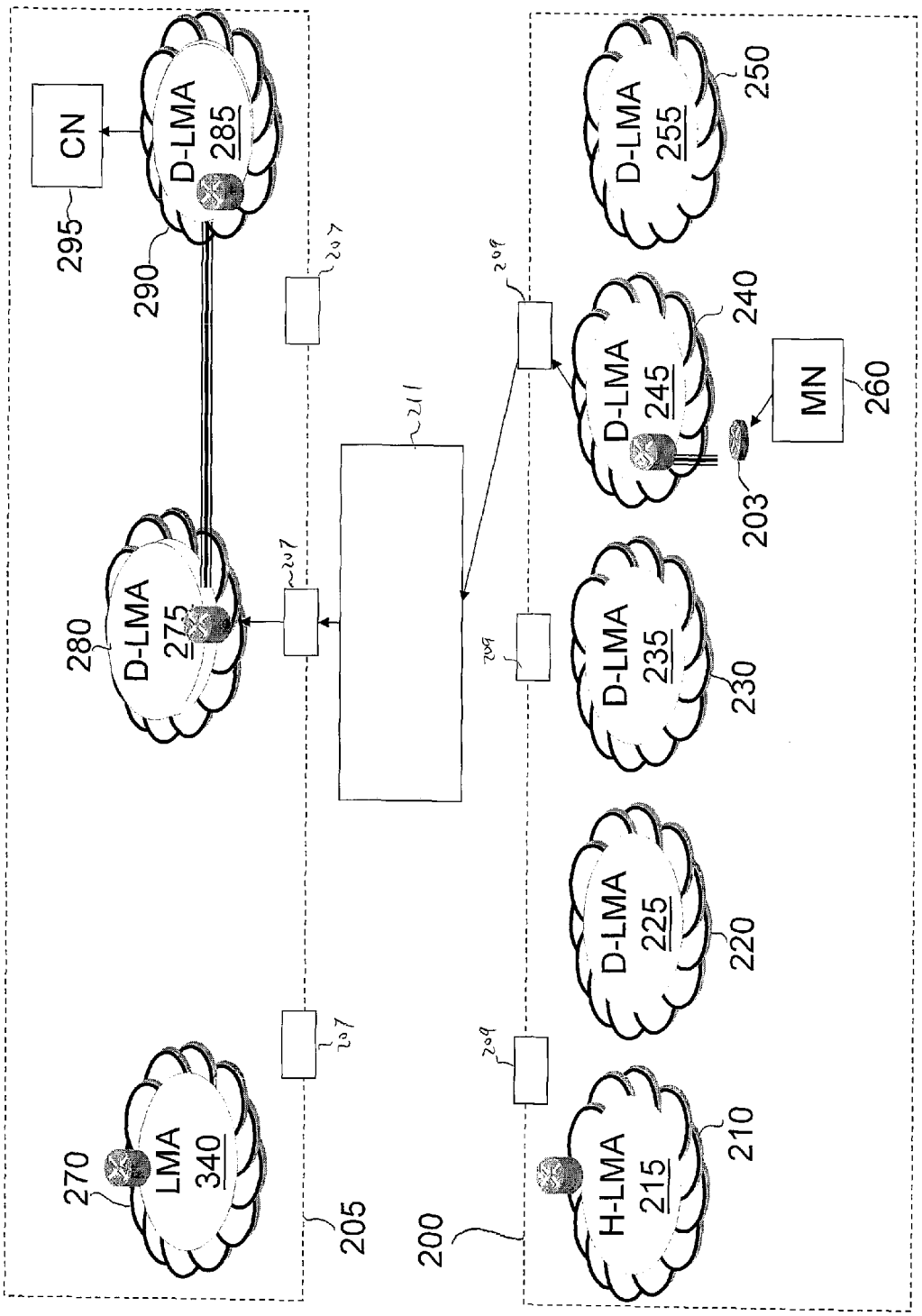
FIG. 3 illustrates a communication from the first system of networks to the second system of networks in accordance with an embodiment of the present invention.

FIG. 3 illustrates the transmission of a data packet from the first MN 260 to the CN 295, which has a fixed location that is already known to the LMAs located within the second system of networks 205. In this embodiment the first MN 260 transmits the data packet to the third D-LMA 245 (through, e.g., the first MAG 203). The third D-LMA 245, recognizing that the prefix contained within the data packet is for a destination address belonging to a different domain, routes the data packet to the first ingress/egress point 209 of the first system of networks 200, and preferably routes the data packet to the nearest one of the first ingress/egress points 209 using, e.g., the "hot potato" routing technique.

The first ingress/egress point 209 may route the data packet to the transit core network 211, which, upon recognizing the address prefix, forwards the data packet to one of the second ingress/egress points 207 of the second system of networks 205. As the data packet enters the second system of networks 205, the use of the ANYCAST technique allows the nearest LMA (in FIG. 3 the fifth D-LMA 275 is illustrated as the nearest LMA) to intercept the data packet upon its entry. Because the address of the CN 295 is known to the fifth D-LMA 275 (as it is known to all of the LMAs within the second system of networks), the fifth D-LMA 275 can utilize its mobility routing functionality and forward the data packet to the sixth D-LMA 285 (where the CN 295 is registered) without having to forward the data packet to the second H-LMA 265. The sixth D-LMA 285 may then forward the data packet to the CN 295. A similar process may be followed for the subsequent data packets sent from the first MN 260 to the CN 295.

Figure 4:
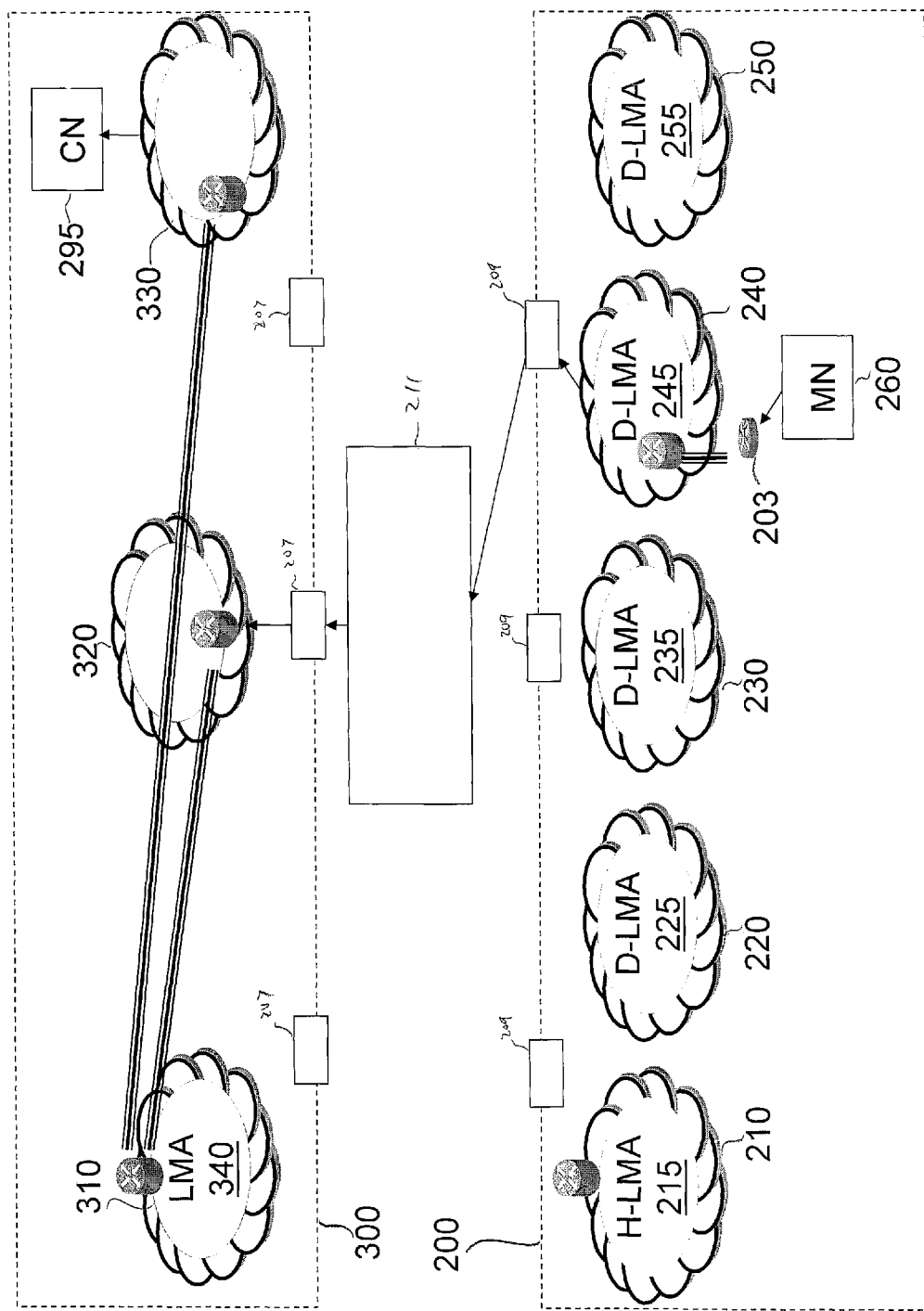
FIG. 4 illustrates a communication from the first system of networks to a third system of networks not utilizing a distributed local mobility anchor architecture in accordance with an embodiment of the present invention.

FIG. 4 illustrates a data packet transmission from the first MN 260 to the CN 295 when the CN 295 is a mobile node located in a third system of networks 300. In this embodiment the third system of networks 300 does not utilize the distributed LMA architecture as described above with respect to FIG. 2A. Rather, the third system of networks 300 may comprise a proxy mobile IP (PMIP) network, such as PMIPv6, consisting of a plurality of networks, such as a ninth network 310, a tenth network 320, and an eleventh network 330 along with third ingress/egress points 340 (which may be similar to the second ingress/egress points 207 described above with respect to FIG. 2).

However, because this is not a distributed LMA architecture, the third system of networks 300 comprises only a single local mobility anchor, such as the second H-LMA 340 located in the ninth network 310 illustrated in FIG. 3. In this embodiment, the first MN 260 may transmit the data packet to the third D-LMA 245 (through, e.g., the first MAG 203). The third D-LMA 245, recognizing that the prefix contained within the data packet is for a destination address belonging to a different domain, routes the data packet to the first ingress/egress point 209 of the first system of networks 200, and preferably routes the data packet to the nearest one of the first ingress/egress points 209 using, e.g., the "hot potato" routing technique.

The first ingress/egress point 209 may route the data packet to the transit core network 211, which, upon recognizing the address prefix, forwards the data packet to a third ingress/egress point 307 of the third system of networks 300. Once within the third system of networks 300, the third system of networks 300 may follow the PMIP routing protocols of that domain, such as the PMIPv6 protocols. The third ingress/egress point 307 may transmit the data packet to the third system of networks 300 and, if the ANYCAST technique is utilized, the tenth network 320, being the nearest network, may intercept the data packet and forward the data packet to the ninth network 310.

If the CN 295 is anchored to the ninth network 310 (which is not shown in FIG. 4), the ninth network 310 may merely forward the data packet to the CN 295. However, because the ninth network 310 does not contain a distributed LMA to perform mobility routing functions, if the CN 295 is not anchored to the ninth network 310, the tenth network 310 may route the data packet to the second H-LMA 340. The H-LMA 340, using its internetwork location management functions and mobility routing functions, may append a current CoA or proxy-CoA to the data packet (which already includes the HoA) and forward the data packet to the eleventh network 330. The eleventh network 330 may then forward the data packet to the CN 295.

Additionally, when the CN 295 is in a visited network in the third system of networks 300, an optimization routine may be performed in which the CN 295 may unveil its CoA or proxy-CoA to the first MN 260 if it is not necessary to protect the privacy of CN 295's current location in the network which may be inferred from the CoA. Then the MN 260 may use CoA of the CN 295 to send packet directly to the CN 295.

Furthermore, one of ordinary skill in the art will recognize that, while the previously discussed embodiment utilizes a PMIP network configurations, this configuration is merely illustrative and is not meant to be limiting. Rather, any suitable configuration for the third network 300, such as a client based mobile IP (in which the data packet may be intercepted by the CN's 295 home anchor (HA), may alternatively be utilized. This configuration and any other suitable configuration are fully intended to be included within the scope of the present invention.

Using these embodiments, while the triangle problem may not be avoided in the third system of networks 300, the transmission of the data packet through the first system of networks 200 may be optimized through the use of the distributed LMA architecture. That is, the packet between the MN 260 and the CN 295 may bypass the first H-LMA 215 in the first network 200 regardless of whether it needs to traverse the LMA 340 in the third system of networks 300. The later may happen if the third network 300 does not support a distributed LMA architecture and the CN 295 is in a visited network. Furthermore, the embodiment illustrated in FIG. 4 allows for communication with other systems that may not be utilizing the distributed LMA architecture while still maintaining some improvement in the transmission of data packets between the dissimilar networks.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of transmitting data, the method comprising:
   receiving a first data packet at an ingress point of a first system of networks, the first data packet comprising a first destination address, the first system of networks comprising a home local mobility anchor and a first distributed local mobility anchor;
   intercepting the first data packet at the first distributed local mobility anchor and routing the first data packet to the home local mobility anchor;
   receiving the first data packet at the home local mobility anchor and, in response to the first data packet, transmitting a second destination address to the first distributed local mobility anchor;
   receiving a second data packet at the ingress point, the second data packet comprising the first destination address; and
   intercepting the second data packet at the first distributed local mobility anchor and routing the second data packet to the second destination address from the first distributed local mobility anchor.

2. The method of claim 1, further comprising transmitting the first data packet from a second system of networks to the ingress point, the second system of networks being independent from the first system of networks.

3. The method of claim 2, wherein the second system of networks comprises a second distributed local mobility anchor.

4. The method of claim 2, wherein the second system of networks is a proxy mobile internet protocol free from distributed local mobility anchors.

5. The method of claim 2, wherein the second system of networks is a mobile internet protocol free from distributed local mobility anchors.

6. The method of claim 2, wherein the second system of networks is free from distributed local mobility anchors.

7. A system for transmitting data comprising:
   a first system of networks, the first system of networks comprising:
      a home local mobility anchor with a first set of functionalities, the first set of functionalities comprising an address allocation function, an internetwork location management function, and a mobility routing function;
      distributed local mobility anchors each with a second set of functionalities smaller than the first set of functionalities, each of the second set of functionalities comprising one or more but not all of the address allocation function, the internetwork location management function, and the mobility routing function, wherein a first one of the distributed local mobility anchors is configured to
         intercept and route a first data packet to the home local mobility anchor, the first data packet received at an ingress point of the first system of networks, the first data packet comprising a first destination address;
         receive a second destination address sent from the home local mobility anchor response to the first data packet; and
         intercept and route a second data packet to the second destination address, the second data packet received at the ingress point of the first system of networks, the second data packet comprising the first destination address; and
      a first ingress/egress point; and
   a second system of networks, the second system of networks being independent from the first system of networks and comprising a second ingress/egress point, wherein the first ingress/egress point is communicably coupled to the second ingress/egress point.

8. The system of claim 7, wherein the second system of networks comprises a second distributed local mobility anchor.

9. The system of claim 7, wherein the second system of networks is a proxy mobile internet protocol network free of distributed local mobility anchors.

10. The system of claim 7, wherein the second system of networks is a mobile internet protocol network free of distributed local mobility anchors.

11. The system of claim 7, wherein the second system of networks is free of distributed local mobility anchors.

12. The system of claim 7, further comprising a transit core network communicably coupled between the first ingress/egress point and the second ingress/egress point.

13. A distributed local mobility anchor in a first system of networks that also comprises a home local mobility anchor, the distributed local mobility anchor comprising:
   a memory configured to store device addresses; and
   a processor coupled to the memory and configured to
      intercept and route a first data packet to the home local mobility anchor, the first data packet received at an ingress point of the first system of networks, the first data packet comprising a first destination address;
      receive a second destination address sent from the home local mobility anchor response to the first data packet; and
      intercept and route a second data packet to the second destination address, the second data packet received at the ingress point of the first system of networks, the second data packet comprising the first destination address.

14. A method of transmitting data, the method comprising:
receiving a first data packet at a first distributed local mobility anchor of a first system of networks;
routing the first data packet to a first destination within the first system of networks, the first data packet having a first destination address;
receiving an second destination address from the first destination, the second destination address being within the first system of networks; and
receiving a second data packet at the first distributed local mobility anchor, wherein the second data packet comprises the first destination address; and
routing the second data packet to a second destination with the second destination address, wherein the second destination is different from the first destination.

15. The method of claim 14, wherein the first destination is a home local mobility anchor.

16. The method of claim 14, further comprising transmitting the first data packet from the first destination to the second destination.

17. The method of claim 14, further comprising transmitting the first data packet and the second data from a second system of networks, the second system of networks being independent from the first system of networks.

18. The method of claim 17, wherein the second system of networks comprises a second distributed local mobility anchor.

19. The method of claim 17, wherein the second system of networks is a proxy mobile internet protocol free from distributed local mobility anchors.

20. The method of claim 17, wherein the second system of networks is a mobile internet protocol free from distributed local mobility anchors.

* * * * *